: 3,102,672
MEANS FOR REMOVING PRESS DISCS FROM EXTRUSION RESIDUES
Josef Schiffers, Rheindahlen, Helmut Robra, Mulheim (Ruhr), and Gustav Driesel, Dusseldorf, Germany, assignors to Schloemann Aktiengesellschaft, Dusseldorf, Germany
Filed June 17, 1960, Ser. No. 36,873
Claims priority, application Germany June 25, 1959
4 Claims. (Cl. 225—103)

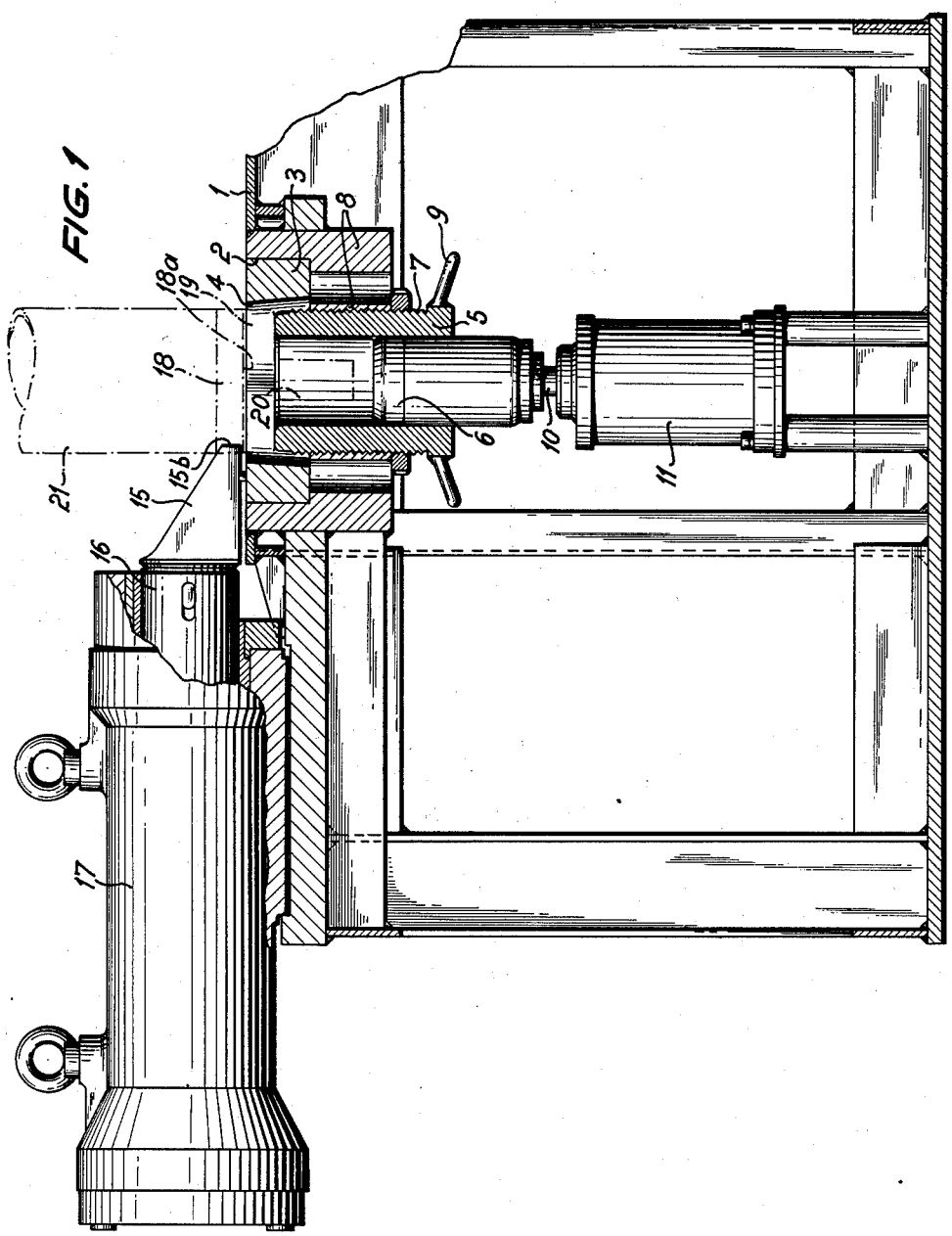

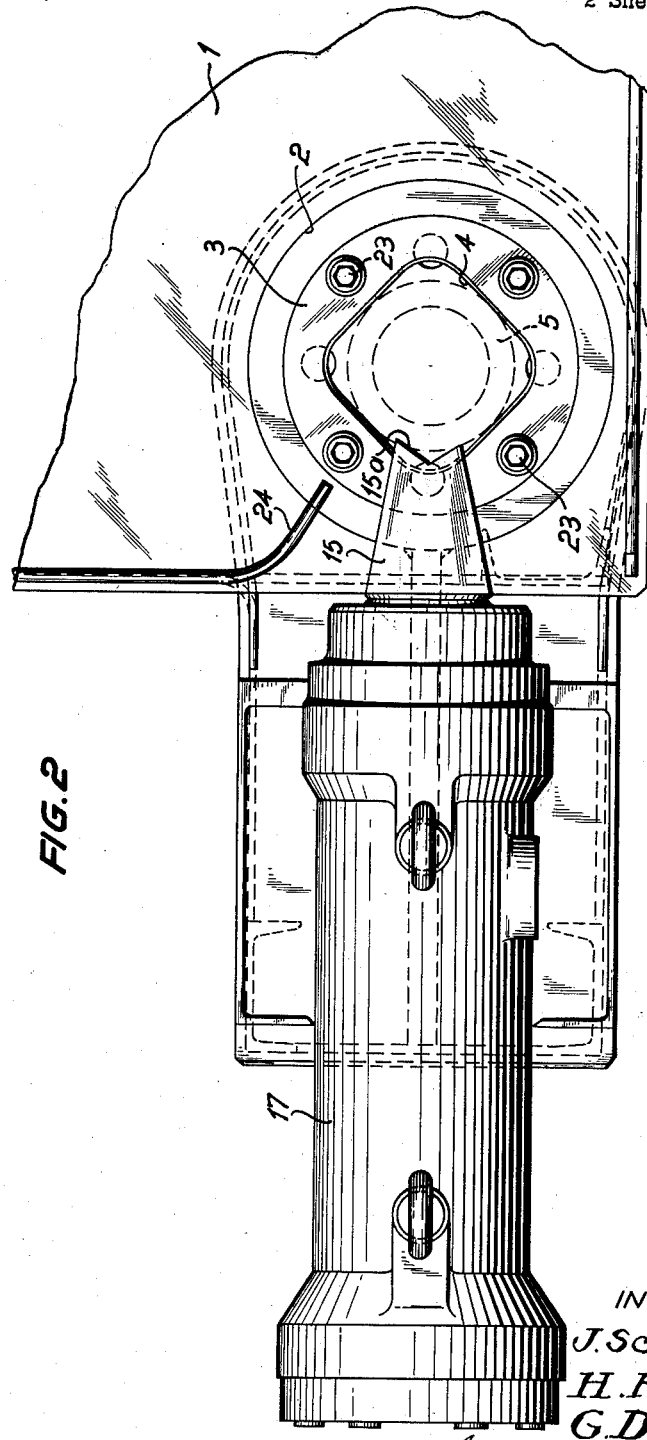

On various grounds it is not possible, when extruding tubular and other material, to extrude the material inserted so completely as not leave any residue. There therefore remains, between the die and the press disc, an extrusion residue or billet butt, the thickness of which, according to circumstances, may vary from about 10 millimetres up to 10 percent of the length of the billet. This residual butt, owing to the high extrusion pressure, adheres firmly to the press disc. When rough billets, that is, unturned billets, are extruded, a press disc is selected the diameter of which is a few millimetres less than the diameter of the container bore. In this case there adheres to the press disc, after the working stroke, in addition to the extrusion residue, also a cartridge, the so-called extrusion skirt, which is in most cases of about the length of the billet extruded.

Now the object of this invention is to free such a press disc, to which a press residue is adhering, and perhaps also an extrusion skirt, as far as possible without injury. Hitherto, in practical operation, this work has in general been carried out by hand by two workmen, by means of a sledge-hammer and a setter. In this case there is the risk that the valuable press disc may be damaged on its edges by heavy hammer blows. Appliances have also already been provided for mechanically separating the press disc from the extrusion residue or extrusion skirt in other ways. These appliances have either had no practical success, or are so expensive that they have found no entry into general practice. The fact that progress has been very tedious in the development of severing appliances shows that this is a difficult problem.

The present invention provides means for removing press discs from extrusion residues, and also from extrusion skirts, if any, more simply than hitherto, and is characterised by an opening in a work-table, into which the extrusion residue mounted on the under side of the press disc can be sunk so far as to be held firmly in position, while the under side of the press disc is almost flush with the surface of the table but very slightly above it. The invention is further characterised by a severing ram which is adapted to travel over the opening in the table at a short distance above the table surface and push the press disc off the extrusion residue.

A good centering of the extrusion residue in the opening is ensured if the opening, according to a further feature of the invention, is constructed at an angle on the side opposite to the severing ram.

Since the edges of the aperture rapidly become worn, a ring is inserted in the opening in a preferred form of the invention, and this ring is provided with a square aperture, one diagonal of which lies in the direction of motion of the severing ram. The arrangement is preferably such that the ring is rotatable and adjustable in the aperture through 90°, 180° and 270°. In this way it may become about uniformly worn on all sides, whereby its term of life is lengthened.

The severing ram centers the extrusion residue particularly well if its front edge is made concave, or provided with a wedge-shaped groove or recess. The severing ram must not engage the extrusion residue with a knife-like edge, but bears against it with a somewhat perpendicularly standing pressure surface.

To enable the apparatus to be employed with extrusion residues of different sizes, the bottom of the aperture is made adjustable in height. In general, this vertical adjustment comes into question only when a change is made from one extrusion programme to another, since within the same extrusion programme, as a rule, equally large extrusion residues accrue.

In order that a residual portion of an extruded product, frequently adhering to the extrusion residue, may not have to be struck off before the insertion of the disc in the appliance according to the invention, the bottom of the aperture is made cup-shaped, in such a way that the rim of the cup carries the extrusion residue, whilst the profile stump of the extrusion residue projects into the cup.

The invention is illustrated by way of example in the accompanying drawings, in which:
FIGURE 1 shows a side view of the invention, partly in section; and
FIGURE 2 shows the corresponding plan.

In a table top 1 there is a circular aperture 2, in which a retaining ring 3 is inserted. This retaining ring has an approximately square aperture 4. One of its diagonals extends in the direction in which a severing or pushing-off ram 15 can work. Into the opening 4 of the retaining ring 3, a cup-shaped bottom or base 5, 6 can be passed from below. The portion 5 thereof is cylindrical, and is screwed by means of a thread 7 into a part 8, which is rigidly connected with the table top.

This screwing in is effected by hand, with the aid of wings 9. The bottom of the cup 5, 6 is formed by a piston 6, which can be displaced in a vertical direction relatively to the portion 5. The piston is mounted on a piston rod 10, which can be moved up and down by means of a compressed-air cylinder 11. At a short distance above the table top 1, the severing ram 15 can be moved to and fro, over the entire aperture 4 of the ring 3. The severing ram is mounted on a piston 16, which is slidable in a cylinder 17.

A press disc 18, which on one side has adhering to it the extrusion residue 19, with a profile stump 20, and on the other side adheres to a so-called skirt 21, is by this appliance to be freed from the portions 19, 20 and 21 of extrusion material. For this purpose, first the portion 5 of the cup-shaped bottom 5, 6 is so adjusted in height that the lower edge 18a of the press disc is located only slightly above the upper surface of the table top 1. The extrusion residue 19 is therefore located substantially below the upper surface of the table top 1. If a traverse is now made with the ram 15, the front 15b (FIGURE 1) of which is made concave, or formed with a wedge-shaped groove recess 15a (FIGURE 2), over the opening of the retaining ring 3, the severing ram 15 bores through the extrusion skirt 21, engages the press disc 18, and pushes the latter away over the table 1. The extrusion residue 19, 20, with the extrusion skirt 21, is in this case somewhat deformed, but remains hanging substantially in the position mentioned. This is assisted by the fact that the front 15b of the severing ram 15 does not engage under the press disc 18 like a knife, but bears against the disc and pushes it towards the right in FIGURE 1.

The cylinder 17, and the piston 16 sliding in it, are so stoutly constructed that the tilting forces that occur during the displacing operation and that tend to rock the left-hand side of the extrusion residue 19 upwards can be counteracted by the piston 16 and its cylinder 17. The severing ram 15 therefore holds the extrusion residue 19 down.

The retaining ring 3 is screwed firmly onto the press plate 1 with four symmetrically distributed screws 23. It can therefore, after releasing the screws 23, be turned through 90°, 180° or 270° and re-fastened, so that different marginal portions become worn each time. It is also possible, after wearing away the retaining edges, to re-condition them, whereby the square aperture is indeed somewhat enlarged, but further use of the retaining ring is not precluded. In particular, it may be employed for press discs of larger diameter.

It is advantageous to provide a blowing pipe 24, through which air is blown, for the purpose of automatically removing small splintering portions of extrusion residue.

The cup 5, 6 is preferably so adjusted that the lower edge of the press disc 18 to be freed is located about 1 to 4 millimetres above the upper surface of the table top 1. The ejection of the extrusion residue 19, 20 is effected with the help of the press cylinder 11, which slides the piston 6 upwards.

As special advantages of the invention it may be emphasized: that the entire operation is effected under the eyes of the operator; that the appliance is simple and robust, and occupies but little space; and that the appliance is applicable to the most varied purposes; for it can be used to free a press disc on which, besides the extrusion residue, a skirt is mounted. It can however also be used for freeing a press disc where there is no extrusion skirt. Finally, it can be employed regardless of the thickness of the extrusion residue.

Appliances may be provided which diminish the distance between the severing ram 15 and the table surface to 1 millimetre, or even less.

The appliance can be employed not merely for copper, brass and aluminium but even for steel.

We claim:

1. An apparatus for separating a press disk from an extrusion residue, such residue including a solid stump and a hollow skirt projecting axially therefrom with the press disk surrounded by the skirt and adhering to the stump, said apparatus comprising a table having an aperture in the upper surface for receiving said stump in a vertical position with the skirt projecting above said table, means for positioning said stump in said aperture with the lower surface of said press disk disposed above the upper surface of said table a distance of the order of 1–4 mm. and a disk-separating ram movable above the upper surface of said table at right angles to the axis of said aperture and in transverse alignment with said disk, the forward end of said ram providing a cutting surface having a horizontal width not greater than approximately one-half the diameter of said disk, said ram having a generally V-shaped recess in said cutting surface for receiving a portion of said skirt and said disk, whereby upon movement of said ram into engagement with one side of said skirt said ram will penetrate said skirt and engage said disk, further movement of said ram serving to push said disk through the opposite side of said skirt to separate said disk from said residue and with said skirt remaining attached to said stump.

2. An apparatus as defined in claim 1, in which a removable and rotatable stump-engaging ring is disposed in said aperture, said ring having a generally rectangular stump receiving axial opening and means to secure said ring against rotation with a diagonal of said opening in alignment with the path of movement of said ram.

3. An apparatus as defined in claim 1, in which said means for positioning said stump in said aperture comprises a cup-like structure disposed below said aperture for engaging the lower surface of said stump to support said stump and skirt and for receiving an extruded portion depending from said stump and means mounting said cup-like structure for vertical adjusting movement.

4. An apparatus as defined in claim 3, in which ejecting means is provided in said cup-like structure for ejecting the extruded portion therefrom subsequent to separation of said disk from said residue.

References Cited in the file of this patent

UNITED STATES PATENTS

| | | |
|---|---|---|
| 223,767 | Shaw | Jan. 20, 1880 |
| 1,826,016 | Naylor | Oct. 6, 1931 |
| 2,106,274 | Frayer et al. | Jan. 25, 1938 |
| 2,203,884 | Stone | June 11, 1940 |
| 2,236,833 | Pell et al. | Apr. 1, 1941 |
| 2,568,438 | Friedman | Sept. 18, 1951 |
| 2,674,124 | Barrett | Apr. 6, 1954 |
| 2,747,667 | Schaming | May 29, 1956 |
| 2,998,134 | Gray | Aug. 29, 1961 |

FOREIGN PATENTS

| | | |
|---|---|---|
| 636,744 | Germany | Oct. 15, 1936 |